United States Patent [19]

Shibahashi et al.

[11] Patent Number: 4,681,791

[45] Date of Patent: Jul. 21, 1987

[54] THERMOCHROMIC TEXTILE MATERIAL

[75] Inventors: Yutaka Shibahashi; Norikazu Nakasuji; Takashi Kataoka; Hiroshi Inagaki, all of Aichi; Tutomu Kito, Gifu; Masaharu Ozaki, Aichi; Nobuaki Matunami, Gifu; Naoya Ishimura; Katuyuki Fujita, both of Aichi, all of Japan

[73] Assignee: Pilot Ink Co., Ltd., Aichi, Japan

[21] Appl. No.: 824,039

[22] Filed: Jan. 30, 1986

[30] Foreign Application Priority Data

Jan. 30, 1985 [JP] Japan ................................. 60-15738
Feb. 5, 1985 [JP] Japan ................................. 60-20244
Feb. 6, 1985 [JP] Japan ................................. 60-21547
Feb. 27, 1985 [JP] Japan ................................. 60-38293
Mar. 29, 1985 [JP] Japan ................................. 60-68129

[51] Int. Cl.$^4$ ..................... C09D 11/06; C09D 11/12
[52] U.S. Cl. ..................... 428/96; 428/196; 428/207; 428/240; 428/254; 428/283; 428/372; 428/913
[58] Field of Search ................. 428/240, 254, 283, 96, 428/196, 207, 372, 913

[56] References Cited

U.S. PATENT DOCUMENTS 4,028,118  6/1977  Nakasuji et al. ................... 428/913

Primary Examiner—Marion E. McCamish
Attorney, Agent, or Firm—Sughrue, Mion, Zinn Macpeak & Seas

[57] ABSTRACT

A textile material in the form of fiber, raw stock, yarn or fabric, which comprises fibers each of which is coated with a thermochromic layer containing a thermochromic pigment having a particle size satisfying the formula:

$$0.01 \le r \le 10 \sqrt{D/d}$$

wherein r represents a particle size of a pigment; D represents fineness (denier) of a fiber; and d represents a density (g/cm$^3$) of a fiber. The textile material can undergo reversible color change in a wide variety of colors and can be applied to any kind of textile products.

10 Claims, 6 Drawing Figures

THERMOCHROMIC TEXTILE MATERIAL

FIELD OF THE INVENTION

This invention relates to a thermochromic textile material which reversibly changes in color with temperature. More particularly, this invention relates to a textile material, such as fibers, raw stock, yarn, fabric, etc., in which a surface of each fiber is coated with a thermochromic coating containing a binder and a thermochromic pigment having a specific particle size. The thermochromic textile material according to the present invention is applicable to a wide range of textile products including clothing, bedding, interior ornaments, toys and the like.

BACKGROUND OF THE INVENTION

In the production of fibers which undergo color change with temperature, application of a liquid crystal ink has been proposed in Japanese Patent Publication No. 2532/76. This technique comprises coating a liquid crystal ink on one or both sides of a sheet base of a deep color, e.g., black or deep blue, and cutting the coated sheet to form flat yarns or twisting the flat yarn around a core yarn to form twisted yarn. Therefore, the product is a sheet rather a fiber, as having a special shape different from general fibers. The freedom of forms and properties are so limited that requirements on various shapes according to purposes cannot be satisfied. Use of a liquid crystal per se extremely reduces moisture resistance making it impossible to wash the product. Further, this technique involves additional disadvantages in that colors of the product are limited only to deep ones; color change temperatures cannot arbitrarily be selected; and a high cost is entailed. In some detail, although the sheet product having a thermochromic coating even on both the upper and lower surfaces thereof, both of the two cut edges thereof are not coated with a thermochromic layer. If in cutting the thermochromic layer-coated sheet in narrow ribbons, the proportion of the surface coated with the thermochromic layer is reduced to ½ or even less, resulting in an extremely deteriorated thermochromic effect. These disadvantages have permitted of no practical use. Accordingly, it has been keenly demanded to develop fibers which can change in a wide variety of colors at optional temperatures.

SUMMARY OF THE INVENTION

An object of this invention is to provide a thermochromic textile material in the form of fiber, raw stock, yarn, fabric, etc., which can eliminate the above-described limitations and can be applicable to any kind of textile products.

The present invention relates to a thermochromic textile material comprising fibers whose surfaces are coated with a thermochromic layer containing a thermochromic pigment having a particle size satisfying the formula:

$$0.01 \leq r \leq 10\sqrt{D/d}$$

wherein r represents a particle size of a pigment in μm; D represents fineness of a fiber in denier; and d represents a density of a fiber in g/cm³.

DETAILED DESCRIPTION OF THE INVENTION

Figure 1:
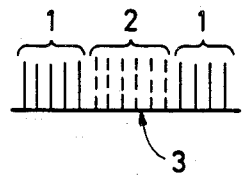
FIGS. 1 to 6 each shows an embodiment of the thermochromic fabric according to the present invention, in which the numerals 1 to 3 indicate thermochromic fibers, non-thermochromic fibers and thermochromic fabric, respectively.

A particle size of a thermochromic pigment which can be used in the present invention should satisfy the above-described formula so that the resulting fiber may exert satisfactory and uniform thermochromism. In the textile material according to the present invention, since each of the constituting fibers is independent, the thermochromic pigment is uniformly distributed among the fibers, and the resulting fibers have good texture and are free from unevenness in thermochromic properties. The present inventors have elucidated that uneven color changes of fibers coated with a thermochromic pigment is due to uneven distribution of the pigment and that such uneven distribution of a pigment is attributed to bridging of the pigment over a plurality of fibers. In other words, when a pigment binds a plurarily of fibers in a bridge form, a thermochromic pigment tends to gather more to these bridged parts. As a result, distribution of the pigment becomes non-uniform, ultimately leading to uneven thermochromism. Seeing that the uneven color change arises from a bridging phenomenon of a pigment, uneven color change cannot be prevented merely by controlling a particle size of the pigment and, therefore, a relationship between the pigment particle size and a fineness of a fiber is an important problem.

As a result of further investigations based on the above-described elucidation, it has now been found that the aforesaid bridging phenomenon leading to uneven color change can duly be prevented when a pigment and a fiber bear relation of $r \leq 10\sqrt{D/d}$. It should be herein noted, however, that the minimum particle size of generally available pigments is about 0.01 μm.

The reason of specifying the relationship between fineness of a fiber and a particle size of a thermochromic pigment by the three variables, r (pigment particle size in μm), D (denier of fiber) and d (density of fiber in g/cm³), is that specification merely by the fineness of a fiber and a particle size of the pigment does not make any sense for prevention of the aforesaid bridging phenomenon of pigment particles in the case of fibers with modified cross-sections, such as a polyhedron and a flat shape.

The present invention is further characterized by the thermochromic layer comprising a pigment and a binder which covers the individual fibers. Owing to this characteristic, the whole textile material has not only uniform distribution of the thermochromic pigment but also uniform texture, softness and adhesion to the pigment. Such a thermochromic fiber is a novel constituting unit that has never been reported. For example, the thermochromic material according to Japanese Patent Publication No. 2532/76 does not have the thermochromic coating over the entire surface thereof. Hence, raw stock, yarn, fabric, and the like compcsed of the fibers according to the present invention are all novel materials showing uniform thermochromism, texture and adhesion to pigments.

In the present invention, conventionally known reversible thermochromic materials comprising combinations of electron-donative color formers and electron-accepting developers can effectively be used as thermochromic pigments according to the present invention. Examples of the known reversible thermochromic materials are disclosed in U.S. Pat. No. 4,028,118, British Patent No. 1,405,701, West German Patent No. 2,327,723, French Patent No. 2,186,516 and Canadian Patent No. 1,025,200.

More specifically, the thermochromic pigments to be used in the present invention includes, for example, a combination of (a) an electron-donative color former, (b) an electron-accepting developer, such as a compound having a phenolic hydroxyl group or a metal salt thereof, an aromatic carboxylic acid, an aliphatic carboxylic acid having from 2 to 5 carbon atoms, aliphatic, alicyclic or aromatic carboxylic acid salts, acid phosphoric esters and metal salts thereof, 1,2,3-triazole and its derivatiives, halohydrin compounds and so on and (c) a color change temperature-controlling agent, such as alcohols, esters, ketones, ethers, acid amides, aliphatic carboxylic acids having 6 or more carbon atoms, thiols, sulfides, disulfides, sulfoxides, sulfones, and the like.

Specific combinations of these components (a), (b) and (c) and their color change temperatures are shown in Table 1 below.

The thus prepared thermochromic pigment is mixed with a binder to form a thermochromic coating composition.

Binders to be used in the present invention include conventional waxes, low melting point thermoplastic resins, rubbers, natural resins and synthetic resins. Examples of these binders are low molecular weight polyethylene, low melting point polyester, an ethylene-vinyl acetate copolymer, chlorinated rubber, a polyvinyl acetate emulsion, a polyethylene emulsion, an acrylic emulsion, a styrene resin emulsion, a butadiene-nitrile emulsion, shellac, zein, an unsaturated polyester resin, an epoxy resin, a cellulose type resin, a polyurethane resin, a phenol resin, a vinyl chloride resin, a vinyl acetate resin, a silicone resin, polyvinyl alcohol, polyvinyl methyl ether, etc.

In addition to the above-described components, colored components, such as commonly employed dyes, fluorescent dyes, pigments, fluoroscent pigments, luminous pigments (light-storing pigments), etc., may also be used in combination. Addition of these colored components realizes reversible color changes between a colored state and another colored state. More specifically, fibers which undergo reversible color change between two colored states can be obtained by (a) adding the aforesaid colored component to a thermochromic composition to form a thermochromic pigment reversibly changing between colored states and coating

TABLE 1

| Component (a) (Amount: parts by weight) | Component (b) (Amount: parts by weight) | Component (c) (Amount: parts by weight) | Color Change Temperature |
| --- | --- | --- | --- |
| 3'-cyclohexylamino-6'-chloro-spiro[isobenzofuran-1 (3H),9'-(9H)xanthen]-3-one (1) | 2,2-bis(chloromethyl)-(chloromethyl)-3-chloro-1-propanol (3) | n-lauryl mercaptan (25) | 40° C. orange⇌colorless |
| 4,5,6,7-tetrachloro-3,3'-bis-[4-(dimethylamino)phenyl]-1(3H)—isobenzofuranone (1) | propyl gallate (2) | di-t-dodecyl disulfide (25) | 50° C. green⇌colorless |
| 3-(1-ethyl-2-methyl-1H—indol-3-yl)-3-(4-diethylamino-2-ethoxyphenyl)-1 (3H)—isobenzofuranone (1) | 2,3-xylyl acid phosphate (2) | di-n-hexyl ketone (25) | 20° C. blue⇌colorless |
| 6'-(diethylamino)-3'-methyl-2'-(octylamino)-spiro(isobenzofuran-1 (3H),9'-(9H)xanthen]-3-one (1) | chlorendic anhydride (2) | stearyl erucate (25) | 33° C. green⇌colorless |
| 3'-methyl-2'-(phenylamino)-6'-(pyrrolidinyl)-spiro[isobenzofuran-1 (3H),9'-(9H)xanthen]-3-one (1) | 2,3-dihydroxynaphthalene (2) | dilauryl adipate (25) | 45° C. black⇌colorless |

The above-described thermochromic pigments can reversibly and instantaneously change their colors from a colored state, such as red, blue, yellow, green, orange, purple, brown, black and any other delicate color tones obtained by blending, into a colorless state or vise versa at a temperature between about −30° C. to about +100° C. A fluorescent brightening agent may be added to these thermochromic materials in order to ensure whiteness in a colorless state and to increase contrast.

The thermochromic pigments can transmit light to become transparent depending on change in temperature so as to visualize the background through the transparent thermochromic layer. The above-described thermochromic materials can be formulated into pigments by particle size reduction, such as encapsulizing into microcapsules, emulsifying in various resins followed by curing, spraying followed by curing by spray-drying, or solidifying or curing followed by finely pulverizing.

the resulting pigment on fibers, (a) encapsulizing or finely pulverizing a mixture comprising the thermochromic pigment reversibly changing between a colored state and a colorless state and the aforesaid colored component and coating the resulting microcapsules or particulate composite material on fibers, or (c) coating the thermochromic pigment reversibly changing between a colored state and a colorless stare on fibers having been colored with general dyes or pigments. A method in which fibers coated with the thermochromic pigment reversibly changing between colored states and fibers colored with general dyes or pigments are mixed may also be employed.

The thermochromic pigment is usually present in the thermochromic composition in a total amount of from 5 to 80% by weight, and preferably from 10 to 60% by weight, on a dry basis from the standpoint of thermochromic effects. If the content of the pioment is less than 5% by weight, the color density is too low to clearly visualize color changes. On the other hand, contents exceeding 80% by weight fail to make complete color disappearance. Therefore, the abovespecified range of from 10 to 60% by weight is the optimum range for maintaining good balance of density and color change.

The thermochromic coating composition for forming a thermochromic layer which comprises the above-described thermochromic pigment and binder and, if desired, colored component may further contain additives, such as antioxidants, ultraviolet absorbents, and the like, for the purpose of extending duration of thermochromic functions.

The thus prepared thermochromic coating composition is coated on fibers to obtain thermochromic fibers according to the present invention which reversibly undergo color change between a colored state and a colorless state or between two colored states in conformity with temperature change.

The thermochromic coating composition is suitably coated to a coverage of from 3 to 90% by weight based on the fiber on a dry basis, with a coverage of from 5 to 70% by weight being particularly preferred in view of color change effects of thermochromism. This specific coverage of the thermochromic layer was determined based on the following clarification reached through extensive studies. That is, coverages less than 3% by weight are favorable for texture but too low to exert clear color change, making the fiber impractical. If the coverage exceeds 90% by weight, the color density is high enough for clear color change, but fusion may readily occur among fibers making it difficult for each fiber to independently exist. As a result, texture of the resulting textile material is so impaired that soft feeling cannot be obtained. Fibers having such a high coverage of the thermochromic layer are, therefore, also impractical. Accordingly, the coverage falling within the range of from 3 to 90% by weight permits of practical use, wherein color density, clear color change and soft texture can all be satisfied. Inter alia, a range of from 5 to 70% by weight provides sufficient color density and distinct color change and allows each fiber to exist completely independently without fusion to each other. Thus, such a fiber having this preferred coverage of a thermochromic layer exhibits remarkably excellent performances because of its well-balanced properties, such as soft texture and sufficient adhesive strength of the pigment.

Single fibers of various materials and forms can be used to be coated with the thermochromic pigment according to the present invention. For example, natural fibers, semi-synthetic fibers, synthetic fibers, other chemical fibers, such as copolymer fibers, inorganic fibers, metal fibers, and the like can be used. Specific examples of these fibers are cotton, wool, goat hair, camel hair, rabbit hair, silk, raw silk yarn, casein fiber, soybean protein fiber, zein fiber, peanut protein fiber, regenerated silk yarn, viscose rayon, cuprammonium rayon, saponified acetate, natural rubber fiber, alginic acid fiber, acetate fiber, triacetate fiber, acetylated staple fiber, ethyl cellulose fiber, chlorinated rubber fiber, polyamide fibers, polyester fibers, polyurethane fibers, polyethylene fiber, polypropylene fiber, polyvinyl chloride fibers, polyvinylidene chloride fibers, polyfluoroethylene fibers, polyacrylonitrile fibers, polyvinyl alcohol fibers, Promix fiber, benzoate fiber, polychlal fiber, polynosic fiber, acrylonitrilealkylvinylpyridine copolymer fibers, acrylonitrilevinyl chloride copolymer fiber, vinyl chloridevinylidene chloride copolymer fiber, vinyl chloridevinyl acetate copolymer fiber, vinyl chlorideacrylonitrile copolymer fiber, vinyl chloride-ethylene copolymer fiber, glass fiber, rock wool, ceramic fiber, carbon fibers, and the like.

From the standpoint of fiber forms, the fibers which can be applied in the present invention include not only those having a general fiber form but fibers with modified cross-sections, such as a triangle, a pentagon, an octagon, a Y-shape, an L-shape, a star shape, a dog-bone shape, a horse-shoe shape, a flat shape, etc.; hollow fibers having hollow cross-sections, such as a macaroni shape, a honeycomb shape, a sponge shape, a check shape, etc.; and conjugate fibers, such as a side-by-side type, a sheath-core type, a matrix type, etc. Fibers with modified cross-sections and hollow fibers are advantageous to obtain high concentrations of pigments since they have large surface areas and easily receive pigments.

As described above, since the textile materials in accordance with the present invention comprise fibers each of which is coated with a thermochromic layer using a thermochromic pigment having a particle size selected according to fineness of fibers to be used, they have excellent performances in terms of uniformity, softness, texture, rub-off resistance, washability and finishing properties and are, therefore, applicable to a wide range of textile products as hereinafter described.

Processes for obtaining textile materials in accordance with the present invention from the thermochromic fibers will be described in detail below.

Thermochromic fibers each having coated thereon a thermochromic pioment can generally be produced by the process, though more or less varying depending on the fiber form, in which a coating composition comprising a thermochromic pigment, and a binder is applied to fibers to be coated, that may have been subjected to crimp if desired, by dipping, brush coating, spray-coating, roll-coating or a like coating technique, and then dried. If desired, the resulting coated fibers may then be subjected to crimp.

Thermochromic raw stock can be produced by cutting the above-described thermochromic fibers (either crimped or not crimped) into appropriate lengths. Further, the raw stock may be produced by dipping raw stock to be coated in the above-described coating composition, removing an excessive composition by centrifugation or by the use of squeeze rollers or an air gun, and drying; or applying the coating composition to raw stock by brush coating, roll coating, spray coating, etc., followed by drying.

Thermochromic yarn can be obtained by using the above-described thermochromic fibers (either crimped or not crimped) as thermochromic filaments. A plurality of such thermochromic filaments may be twisted to form thermochromic filament yarns. Further, the aforesaid thermochromic raw stock may be subjected to carding to form thermochromic sliver, which is then spun to obtain thermochromic spun yarns.

Thermochromic woven fabric can be produced by weaving the above-described thermochromic fibers on a loom into various fabric structures, such as plain weave, ridge weave, twill weave, satin weave, double weave, etc.

Thermochromic non-woven fabric can be obtained from a fibrous mass which is obtained as follows. The above-described thermochromic fibers (either crimped or not crimped) are shaped into a filament sheet or cut to appropriate lengths to form thermochromic raw stock. The thermochromic raw stock may also be formed by dipping raw stock to be coated in the coating composition, removing the excessive composition by means of a centrifugator, squeeze rollers, an air gun, etc., and dried, or directly coating the composition on the raw stock by spray coating, brush coating, roll coating, etc., and dried. Of the thus obtained thermochromic fiber mass, the filament sheet can be finished into non-woven fabric as it is, but the raw stock should be shaped into web by carding. A necessary number of the resulting filament sheets or webs are laminated each other and mechanically united in one body by stitch-bonding or needling, or adhered to each other by immersing the laminate in an adhesive, spraying an adhesive, incorporating a powderous, thread-like or fibrous adhesive between sheets or webs, or applying heat or pressure to the laminate.

Thermochromic knitted fabric can be obtained by knitting the thermochromic filament, filament yarn or spun yarn, etc. prepared in the same manner as in the production of thermochromic woven fabric with tubular stitches, plain stitches, pearl stitches, rib stitches, single denbigh stitches, single atlas stitches, single cord stitches, double denbigh stitches, double atlas stitches, double cord stitches, lace stitches, etc.

Thermochromic pile fabric herein referred to includes various pile fabrics, such as high-pile fabric, flocked fabric, etc. The thermochromic pile fabric is obtained by weaving the aforesaid thermochromic filament, filament yarn or spun yarn as a warp yarn in a warp pile structure, such as velvet, plush, etc., or as a weft yarn in a weft pile structure, such as velveteen, corduroy, etc., and cutting the loops at an appropriate position to thereby cover the surface of the fabric with piles. The loops may not be cut in the production of towel, carpet, etc. Further, the thermochromic pile fabric may also be obtained by applying the coating composition to a previously formed pile fabric by dipping, printing, coating, spraying or a like technique, drying the coated fabric, and then cutting the loops. Thermochromic high-pile fabric is obtained by subjecting the above-described thermochromic raw stock to carding to form sliver, which is then woven by means of a high-pile knitting machine. Since the high-pile fabric has long piles and a high content of the thermochromic pigment, it is particularly excellent in thermochromic properties.

Thermochromic flocked fabric can be produced by cutting the above-described thermochromic filament to appropriate lengths to form flocks and adhering the flocks onto a base by mechanical flock finish, such as spreading, vibration, spraying, etc., or electrostatic flock finish, or a like method.

The thermochromic fibers in accordance with the present invention may be blended with uncoated fibers which do not have a thermochromic layer and include dyed fibers and undyed fibers. The proportion of the uncoated fibers to be blended ranges from 0.01 to 20 parts by weight, and preferably from 0.1 to 10 parts by weight, per part by weight of the thermochromic fibers. Blending with the uncoated fibers is effective to increase gloss, voluminousness and to visualize clear color changes as well as to lessen loads directly imposed on the thermochromic fibers upon application of heat, exposure to sunlight or ultraviolet rays, and the like.

As the proportion of the uncoated fibers to be blended becomes high, the surface gloss of the resulting textile material is more improved. However, if it exceeds 20 parts by weight, it becomes difficult to clearly visualize thermochromism. Accordingly, the range of from 0.1 to 10 parts by weight is particularly agreeable with thermochromism, gloss and softness to the eyes.

Working embodiments of the textile materials according to the present invention will be described below with reference to the accompanying drawings.

Figure 2:
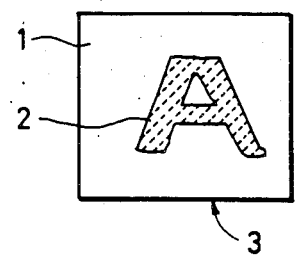
Figure 3:
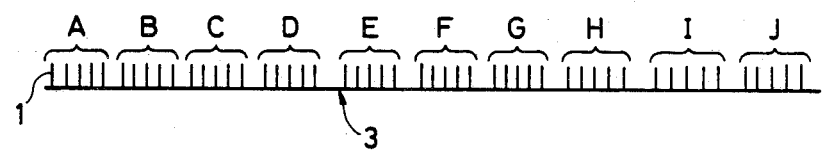
Figure 4:
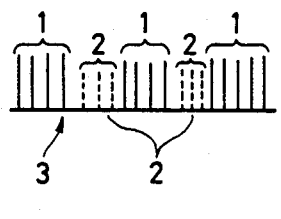
Figure 5:
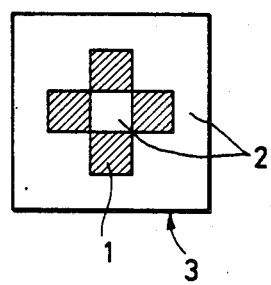
Figure 6:
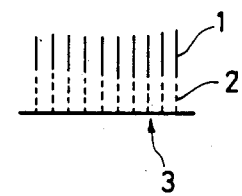

In FIGS. 1 to 6, the numerals 1, 2 and 3 indicate thermochromic fibers, non-thermochromic fibers and thermochromic fabric, respectively. FIG. 2 shows a pattern formed by a combination of thermochromic fibers and non-thermochromic fibers as having a cross-sectional view shown in FIG. 1. When both the fibers have the same color at room temperature, the pattern shows itself only upon temperature change. FIG. 3 shows thermochromic fabric composed of plural kinds of thermochromic fibers A to J having different color changing temperatures, in which a pattern, e.g., letters, designs or figures, made of these different thermochromic fibers can change or move with change in temperature. FIG. 4 shows fabric in which non-thermochromic fibers 2 are screened with thermochromic fibers 1 so that the non-thermochromic fibers 2 are kept from sight under normal conditions. If a pattern, e.g., letters, designs, figures, etc., is formed by the non-thermochromic fibers, this pattern appears when the thermochromic fibers change into a colorless or pale-colored state with temperature change. Such appearance and disappearance of a pattern can be made more complicated. In some detail, a pattern is formed each by thermochromic fibers 1 and non-thermochromic fibers 2 so that the pattern made of fibers 2 may appear upon thermal color change of fibers 1. Further, a pattern may be formed by a combination of both fibers 1 and 2, and another pattern is formed by the thermochromic fibers alone, whereby a pattern changes into the pattern made of the combination of both fibers with temperature change. FIG. 5 shows a change of a three-dimensional pattern made of a combination of long fibers and short fibers, whichever fibers may be thermochromic with the another being non-thermochromic. According to this embodiment, the color change with temperature is outstanding because of the three dimensions of the pattern. This effect is particularly great in the case of fabric covered with long fibers, e.g., pile fabric. FIG. 6 shows an embodiment wherein the tips of fibers on the surface of fabric are thermochromic with the roots thereof being non-thermochromic. The color or pattern of the non-thermochromic fibers appears when the tips turns into a colorless state upon temperature change. In this case, the color of the tips may be different from that of the roots, or the fibers may have different colors in 3 or more divided parts.

Thus, the thermochromic fabric of the present invention not only undergo color change between a colored state and a colorless state but also form various patterns of various colors.

The present invention can further realize a reversible color change between a natural color and another color, especially white. For example, when a pattern of a natural color is formed by weaving or knitting thermochromic fibers coated with each of a thermochromic pigment reversibly changing between yellow and white, a thermochromic pigment reversibly changing between magenta and white and a thermochromic pigment reversibly changing between cyan and white by means of a computor in accordance with each of patterns obtained by separating the pattern of a natural color into three primary colors by a computor, the pattern of a natural color makes its appearance and disappearance with change in temperture. When these three kinds of thermochromic fibers are embroidered on nonthermochromic fabric using a computor to form the respective color-separated pattern, the pattern of a natural color also makes its appearance or disappearance on the fabric according to a temperature change.

Furthermore, when each of coating compositions prepared from each of these three pigments is printed on non-thermochromic fabric by a computor printing machine to form each of patterns obtained by three color separation, a pattern of a natural color makes its appearance and disappearance on the printed area.

The textile materials in accordance with the present invention can be applied to any kind of textile products. Examples of textile products to which the present invention is applicable are clothing, e.g., sweaters, cardigans, vests, polo shirts, shirts, blouses, suits, blazers, jackets, slacks, skirts, jerseies, jumpers, sportswear, working clothes, Japanese clothes, coats, raincoats, gowns, pajamas, bathrobes, ski clothes, underwear, bathing costumes, etc.; outfittings or small wears, e.g., socks, gloves, scarves, shawls, mufflers, headgear, earmuffs, slippers, neckties, veils, bages, belts, towel, handkerchiefs, bags, etc.; bedding, e.g., bed sheets, blankets, robes, quilts, quilt fillings, etc.; interior ornaments, e.g., carpets, rugs, mats, chair covers, cushions, moquette, curtains, canvas, wallcloth, sound-absorbing curtains, lagging materials, lamp shades, partition screens, window blinds, etc.; fancy articles, e.g., artificial flowers, embroidery thread, race, ribbons, ropes, stuffed toys, dolls' hair, dolls' clothes, artificial snow for Christmas trees, etc.; outdoor articles, e.g., sailcloth, tents, cheesecloth, hoses, hoods, tarpaulin, mountain-climbing boots, lifeboats, rucksacks, packing cloth, parachutes, nets, etc.; and others, e.g., false beard or mustache, false eyelashes, wigs, toupees, balls, napkins, etc.

Taking stuffed toys for instance, thermochromic stuffed toys can be produced by cutting the thermochromic fabric of the present invention to prescribed sizes in agreement with paper patterns for the desired toy and sewing the cut pieces of the fabric. On this occasion, different kinds of the thermochromic fabric having various colors may be employed to obtain stuffed toys changing in multi-color. As a matter of course, sewing may be replaced by adhesion or fusion bonding. Further, thermochromic fabric may be partly attached to a stuffed toy made of non-thermochromic fabric to make the toy multi-color thermochromic.

The present invention will now be illustrated in greater detail with reference to the following Examples, Comparative Examples, Comparative Test Examples and Use Examples, but it should be understood that the present invention is not limited thereto. In these examples, all the parts and percents are by weight unless otherwise indicated.

EXAMPLE 1

A thermochromic composition comprising 1 part of Crystal Violet Lactone, 3 parts of benzyl 4-hydroxybenzoate and 25 parts of stearyl alcohol was encapsulized by coacervation in a gelatin-gum arabic system to form thermochromic microcapsules having a particle diameter of 8 $\mu$m which satisfied the formula $r \leq 10\sqrt{D/d}$. Five hundreds grams of 7D polyurethane fibers (d = 1.21) were dipped in a coating composition prepared by uniformly mixing 150 g of the above obtained microcapsules, 450 g of an aqueous urethane resin emulsion (solid content: about 41%) and 24 g of an aqueous epoxy resin, taken out of the coating composition, and dried at 110° C. for 2 minutes to obtain 550 g of thermochromic polyurethane fibers. The resulting fibers had a blue color at temperatures below 53° C., turned to be colorless at temperatures above 53° C., and again returned to blue at temperatures below 53° C., indicating reversible thermochromism.

EXAMPLE 2

A thermochromic composition comprising 1 part of 9-(diethylamino)-1-spiro[12-H-benzo[$\alpha$]xanthene2,1'(3'H)-isobenzofuran]-3'-one, 2 parts of bisphenol A, 15 parts of myristyl alcohol and 10 parts of stearyl caprate was encapsulized by interfacial polymerization using an epoxy resin-amine curing agent system to obtain thermochromic microcapsules having a particle size of 5 $\mu$m which satisfied the formula $r \leq 10\sqrt{D/d}$. Sixty grams of the thermochromic microcapsules, 200 g of a glycidyl ether type epoxy resin and 80 g of an amine curing agent were uniformly mixed, and the resulting coating composition was applied to 300 g of 5D nylon fibers (d = 1.14) with a spray gun, followed by drying at 80° C. for 30 minutes to obtain 360 g of thermochromic nylon fibers.

The thermochromic nylon fibers had a pink color at temperatures below 25° C., turned to colorless at temperatures above 25° C. and again returned to pink upon lowering the temperature below 25° C., indicating reversible thermochromism.

EXAMPLE 3

A thermochromic composition comprising 1 part of 2'-chloro-6'-(diethylamino)-3'-methyl-spiro[isobenzofuran-1(3H),9'-[9H]xanthen]-3-one, 2 parts of zinc benzoate and 25 parts of diphenyl ether was solidified to the inside thereof using an epoxy resin/amine curing agent system to obtain thermochromic fine particles having a particle size of 12 $\mu$m which satisfied the formula $r \leq 10\sqrt{D/d}$. Two hundreds grams of the thermochromic fine particles and 800 g of an acrylic ester resin emulsion having a solid content of about 42% were uniformly mixed, and 1000 g of 10D vinyl chloride-vinyl acetate copolymer fibers (d = 1.34) were dipped in the resulting coating composition, taken out therefrom, and dried at 90° C. for 10 minutes to obtain 1280 g of thermochromic vinyl chloride-vinyl acetate copolymer fibers.

These fibers had a vermilion color at temperatures below 10° C., turned to colorless at temperature above 10° C. and returned to vermilion upon lowering the temperature below 10° C., indicating reversible thermochromism.

EXAMPLE 4

With 750 parts of polypropylene were uniformly kneaded 1 part of 6'-(diethylamino)-3'-methyl-2'-(phenylamino)-spiro[isobenzofuran-1(3H),9'[9H]xanthen]-3-one, 3 parts of 4-chlorobenzoic acid and 25 parts of stearic acid amide. The mixture was cooled and finely pulverized to obtain thermochromic fine particles having a particle diameter of 4 $\mu$m which satisfied the formula $r \leq 10\sqrt{D/d}$. Two hundreds grams of the thermochromic fine particles and 800 g of a vinyl acetate-ethylene-vinyl chloride terpolymer emulsion having a solid content of about 50% were uniformly mixed, and 1000 g of silk fibers (d = 1.33) having a fineness corresponding to 3D were dipped in the resulting coating composition, taken out therefrom, and dried at 100° C.

for 5 minutes to obtain 1080 g of thermochromic silk fibers.

The resulting silk fibers had a black color at temperatures below 95° C., turned to colorless at temperatures above 95° C. and returned to black at temperatures below 95° C., indicating reversible thermochromism.

EXAMPLE 5

A thermochromic composition comprising 1 part of 3,3-bis(1-ethyl-2-methyl-1H-indol-3-yl)-1(3H)-isobenzofuranone, 2 parts of a zinc salt of bisphenol A and 25 parts of cetyl alcohol was solidified to the inside thereof using an epoxy resin/amine curing agent to obtain thermochromic fine particles having a particle size of 4 μm which satisfied the formula $r \leq 10\sqrt{D}/d$. One hundred grams of the thermochromic fine particles and 700 g of an acrylate ester-vinyl acetate copolymer emulsion having a solid content of about 45% were uniformly mixed to prepare a coating composition. Eight hundreds grams of 5D acrylonitrile-vinyl chloride copolymer fibers having a flat crosssection were dipped in the coating composition, taken out therefrom, and dried at 100° C. for 10 minutes to obtain thermochromic acrylonitrile-vinyl chloride copolymer fibers (d=1.25). The fibers were subjected to crimping and cut to a length of 127 mm to obtain 880 g of thermochromic acrylonitrile-vinyl chloride copolymer raw stock.

The resulting raw stock had a pink color at temperatures below 40° C., turned to colorless at temperatures above 40° C. and again returned to pink at temperatures below 40° C., indicating reversible thermochromism.

EXAMPLE 6

A thermochromic composition consisting of 1 part of Crystal Violet Lactone, 3 parts of octyl 4hydroxybenzoate and 25 parts of butyl stearate was encapsulized by interfacial polymerization using an acrylic resin/amine curing agent system to obtain thermochrcmic microcapsules having a particle size of 12 μm which satisfied the formula $r \leq 10\sqrt{D}/d$. One hundred grams of the microcapsules and 650 g of an ethylene-vinyl acetate copolymer emulsion having a solid content of about 50% were uniformly mixed to prepare a coating composition. The coating composition was sprayed on 700 g of 10D vinyl chloridevinylidene chloride copolymer fibers (d=1.7) having been subjected to crimping using a spray gun, followed by drying at 90° C. for 15 minutes. The resulting thermochromic vinyl chloride-vinylidene chloride copolymer fibers were cut on the bias to lengths of from 50 mm to 90 mm to obtain 790 g of thermochromic vinyl chloride-vinylidene chloride copolymer raw stock.

The resulting raw stock had a blue color at temperatures below 10° C., turned to colorless at temperature above 10° C. and again returned to blue upon lowering the temperature below 10° C., indicating reversible thermochromism.

EXAMPLE 7

One part of Crystal Violet Lactone, 2 parts of 4,4-methylenediphenol and 25 parts of stearone were uniformly kneaded with 800 parts of polyethylene, and the mixture was cooled and pulverized to form thermochromic fine particles having a particle size of 8 μm which satisfied the formula $r \leq 10\sqrt{D}/d$. Three hundreds grams of the thermochromic fine particles and 400 g of an acrylic ester emulsion having a solid content of about 45% were uniformly mixed to prepare a coating composition. Five hundreds grams of 7D polyacrylonitrile raw stock (d=1.17) cut on the bias to lengths of 80 mm to 130 mm were dipped in the coating composition and, after removal of the excessive composition by centrifugation, dried at 100° C. for 10 minutes to obtain 650 g of thermochromic polyacrylonitrile raw stock.

The resulting raw stock had a blue color at temperatures below 85° C., turned to colorless at temperatures above 85° C. and again returned to blue at temperatures below 85° C., indicating reversible thermochromism.

EXAMPLE 8

A thermochromic composition consisting of 1 part of 3',6'-dimethoxy-spiro[isobenzofuran-1(3H),9'[9H]xanthen]-3-one, 2 parts of dodecyl gallate and 25 parts of caprylic acid was encapsulized by coacervation in a gelatin/gum arabic system to obtain thermochromic microcapsules having a particle size of 10 μm which satisfied the formula $r \leq 10\sqrt{D}/d$. Five hundreds grams of the microcapsules and 500 g of an acrylic ester resin emulsion having a solid content of about 42% were uniformly mixed to prepare a coating composition, and 800 g of cotton (d=1.54) having a fineness corresponding to 5D was dipped in the coating composition, squeezed through squeeze rolls and dried at 110° C. for 3 minutes to obtain 980 g of thermochromic cotton.

The resulting thermochromic cotton had a yellow color at temperatures below 15° C., tunred to colorless at temperature above 15° C. and again returned to yellow, indicating reversible thermochromism.

EXAMPLE 9

A thermochromic composition consisting of 1 part of 6'-(cyclohexylamino)-3'-methyl-2'-(phenylamino)-spiro[isobenzofuran-1(3H),9'-[9H]xanthen]-3-one, 2 parts of 5,5-bis(1,2,3-benzotriazole) and 25 parts of myristyl alcohol was encapsulized by interfacial polymerization using an acid chloride/phenol system to obtain thermochromic microcapsules having a particle size of 4 μm which satisfied the formula $r \leq 10\sqrt{D}/d$. Five hundreds grams of the thermochromic microcapsules and 450 g of a vinyl acetate-ethylene-vinyl chloride terpolymer emulsion having a solid content of about 50% were uniformly mixed to prepare a coating composition, and 750 g of 3D polypropylene fibers (d=0.91) was dipped in the composition, taken out therefrom, and dried at 100° C. for 5 minutes to obtain thermochromic polypropylene fibers. The resulting fibers were made into a bundle consisting of 30 fibers and twisted with a number of twist of 30/m to obtain thermochromic polypropylene filament yarn.

The resulting yarn had a black color at temperatures below 38° C., turned to colorless at temperatures above 38° C. and again returned to black upon temperature fall below 38° C., indicating reversible thermochromism.

EXAMPLE 10

A thermochromic composition consisting of 1 part of 3-(1-ethyl-2-methyl-1H-incdol-3-yl)-3-(4-diethylaminophenyl)-1(3H)-isobenzofuranone, 2 parts of naphthoic acid, 12.5 parts of palmitic acid and 12.5 parts of decyl caprylate was solidified to the inside thereof with an epoxy resin/amine curing agent system to obtain thermochromic fine particles having a particle size of 10 μm which satisfied the formula $r \leq 10\sqrt{D}/d$. A coating composition prepared by uniformly mixing 60 g of the resulting thermochromic fine particles, 200 g of an epoxy resin and 80 g of an amine curing agent was sprayed on 300 g of 5D crimped nylon fibers, followed by drying at 80° C. for 30 minutes to obtain thermochromic nylon fibers (d=1.14). The nylon fibers were made into bundles each consisting of 25 fibers and twisted with a number of twist of 40/m to obtain 350 g of thermochromic nylon yarn.

The resulting nylon yarn had a blue color at temperatures below −3° C., turned to colorless ar temperatures above −3° C. and again returned to blue at temperatures below −3° C., indicating reversible thermochromism.

EXAMPLE 11

One part of 3′-(diethylamino)-6′,8′-dimethyl-spiro[isobenzofuran-1(3H),9′-[9H]xanthen]-3-one, 2 parts of 1,1-bis(4-hydroxyphenyl)cyclohexane and 25 parts of dilauryl ether were uniformly kneaded with 750 g of polypropylene, and the mixture was cooled and finely pulverized to obtain thermochromic fine particles having a particle size of 8 μm which satisfied the formula $r \leq 10\sqrt{D/d}$. Five hundreds grams of the thermochromic fine particles and 500 g of an acrylic ester resin emulsion having a solid content of 45% were uniformly mixed to prepare a coating composition, and 500 g of 7D crimped polyacrylonitrile hollow fibers with a sponge-like cross-section were dipped in the coating composition, taken out therefrom, and dried at 100° C. for 10 minutes to obtain thermochromic polyacrylonitrile fibers (d=1.17). The resulting fibers were cut on the bias to lengths of 100 mm to 150 mm to form thermochromic polyacrylonitrile raw stock. The raw stock was subjected to carding to form sliver, which was then spun to obtain 600 g of spun yarn made of thermochromic polyacrylonitrile hollow fibers.

The resulting thermochromic spun yarn had an orange color at temperatures below 30° C., turned to colorless at temperature above 30° C. and returned to orange upon temperature fall below 30° C., indicating reversible thermochromism.

EXAMPLE 12

A thermochromic composition consisting of 1 part of 6′-(diethylamino)-2′-[cyclohexyl(phenylmethyl)amino]-spiro[isobenzofuran-1(3H),9′-[9H]xanthen]-3-one, 3 parts of 5-chloro-1,2,3-benzotriazole and 25 parts of butyl palmitate was encapsulized by interfacial polymerization using a polyisocyanate/amine curing agent system to obtain thermochromic microcapsules having a particle size of 10 μm which satisfied the formula $r \leq 10\sqrt{D/d}$. One hundred grams of the microcapsules and 500 g of a polyester resin emulsion having a solid content of about 25% were uniformly mixed to prepare a coating composition. In the coating composition was dipped 500 g of 8D polyester raw stock (d=1.38) having been dyed in yellow and, after removal of the excessive composition with an air gun, dried at 100° C. for 5 minutes. The resulting thermochromic polyester raw stock was subjected to carding into sliver, which was then spun to obtain 600 g of thermochromic polyester spun yarn.

The resulting spun yarn had a green color at temperatures below −10° C., turned to yellow at temperatures above −10° C. and again returned to green upon temperature fall below −10° C., indicating reversible thermochromism.

EXAMPLE 13

The thermochromic polyurethane fibers obtained in Example 1 were subjected to crimping, and bundles each consisting of 30 crimped fibers were twisted with a number of twist of 35/m. The resulting twisted thermochromic filament yarn was woven in plain weave on a loom. The resulting fabric showed the same thermochromism as in Example 1.

EXAMPLE 14

The thermochromic nylon fibers obtained in Example 2 were cut on the bias into lengths of 70 to 130 mm, and the resulting raw stock was subjected to carding to form sliver, which was then spun into spun yarn. The spun yarn was woven on a loom with the twill to obtain thermochromic nylon twill fabric. This fabric showed the same thermochromism as in Example 2.

EXAMPLE 15

10D polyacrylonitrile hollow fibers (d=1.17) having a sponge-like cross-section were cut on the bias to lengths of from 80 to 130 mm, and 1000 g of the resulting raw stock was dipped in the same amount of the same coating composition as used in Example 3. After removal of the excessive composition by centrifugation, the raw stock was dried at 90° C. for 10 minutes, subjected to carding to form sliver, and spun into spun yarn. The resulting spun yarn was woven on a loom with the satin to obtain thermochromic hollow polyacrylonitrile satin weave fabric showing the same thermochromism as in Example 3.

EXAMPLE 16

The thermochromic silk fibers obtained in Example 4 were made into bundles each consisting of 30 fibers and twisted with a number of twist of 40/m. The resulting thermochromic silk filament yarn was woven on a loom with the ridge to obtain thermochromic silk ridge weave fabric showing the same thermochromism as in Example 4.

EXAMPLE 17

Eight hundreds grams of 5D vinyl chloridevinyl acetate copolymer crimped fibers (d=1.34) were dipped in the same amount of the same coating composition as used in Example 5, taken out therefrom and dried at 100° C. for 10 minutes. The resulting thermochromic vinyl chloride-vinyl acetate copolymer fibers were cut to a length of 45 mm and shaped into web by a carding machine. Four sheets of the resulting web were parallel-laminated, and the laminate was soaked in an SBR resin emulsion, squeezed by rolls and dried to obtain thermochromic vinyl chloride-vinyl acetate copolymer non-woven fabric. This fabric showed the same thermochromism as in Example 5.

EXAMPLE 18

The same thermochromic composition as used in Example 6 was encapsulized by interfacial polymerization using a polyisocyanate/amine curing agent to obtain thermochromic microcapsules having a particle size of 12 μm which satisfied the formula $r \leq 10\sqrt{D/d}$. One hundred parts of the microcapsules and 650 parts of an ethylene-vinyl acetate copolymer emulsion having a solid content of about 50% were uniformly mixed to prepare a coating composition. Seven hundreds parts of 10D polyester raw stock (d=1.38) were dipped in the coating composition, centrifuged to remove the excessive coating composition, and dried at 90° C. for 15 minutes to obtain thermochromic polyester raw stock. The raw stock was subjected to carding into web. Three sheets of web were cross-laminated, and an NER resin emulsion was sprayed thereon from a spray nozzel, followed by drying to obtain thermochromic polyester non-woven fabric.

This non-woven fabric showed the same thermochromism as in Example 6.

EXAMPLE 19

A thermochromic composition consisting of 1 part of Crystal Violet Lactone, 2 parts of 4,4methylenediphenol and 25 parts of butyl palmitate was encapsulized by interfacial polymerization using an acrylic resin/amine curing agent system to obtain thermochromic microcapsules having a particle size of 12 $\mu$m which satisfied the formula $r \leq 10\sqrt{D/d}$. Three hundreds parts of the microcapsules and 400 parts of an acrylic ester emulsion having a solid content of about 45% were uniformly mixed to prepare a coating composition, and 500 parts of 10D vinyl chloridevinylidene chloride copolymer raw stock (d=1.7) was dipped therein and, after removal of the excessive composition using an air gun, dried at 100° C. for 10 minutes. The resulting thermochromic vinyl chloridevinylidene chloride copolymer raw stock was subjected to carding to form sliver, which was then spun to obtain thermochromic spun yarn. The yarn was knitted with tubular stitches to obtain thermochromic knitted fabric.

This knitted fabric had a blue color at temperatures below $-10°$ C., turned to colorless at temperatures above $-10°$ C. and again returned to blue upon temperature fall below $-10°$ C., indicating reversible thermochromism.

EXAMPLE 20

One part of 9-(diethylamino)-spiro[12-H-benzo[benzo[$\alpha$]xanthene-12,1'(3'H)-isobenzofuran]-3'-one, 2 parts of dodecyl gallate and 25 parts of stearone were uniformly kneaded with 800 parts of polyethylene, and the mixture was cooled followed by pulverizing to obtain thermochromic fine particles having a particle size of 10 $\mu$m which satisfied the formula $r \leq 10\sqrt{D/d}$. Five hundreds parts of the fine particles and 500 parts of a polyester resin emulsion having a solid content of about 25% were uniformly mixed to obtain a coating composition, and 800 parts of 7D polyester fibers (d=1.38) with a triangle cross-section was dipped in the coating composition, taken out therefrom, and dried at 100° C. for 5 minutes. The resulting thermochromic polyester fibers were subjected to crimping, and the crimped fibers were make into bundles each consisting of 35 fibers and twisted with a number of twist of 30/m. The resulting thermochromic filament yarn was knitted with dcuble denbigh stitches on a knitting machine to produce knitted fabric.

The thus obtained knitted fabric had a pink color at temperatures below 85° C., turned to colorless at temperatures above 85° C. and returned to pink upon temperature fall below 85° C., indicating reversible thermochromism.

EXAMPLE 21

A thermochromic composition consisting of 1 part of 6'-(diethylamino)-2'-[cyclohexyl(phenylmethyl)amino]-spiro[isobenzofuran-1(3H),9'-[9H]xanthen]- 3one, 2 parts of 5,5-bis(1,2,3-benzotriazole) and 25 parts of caprylic acid was encapsulized by coacervation using a gelatin/gum arabic system to obtain thermochromic microcapsules having a particle size of 8 $\mu$m which satisfied the formula $r \leq 10\sqrt{D/d}$. Five hundreds parts of the microcapsules were uniformly mixed with 450 parts of an acrylic ester resin emulsion having a solid content of about 42% to prepare a coating composition, and 700 parts of 6D acrylonitrile-vinyl acetate copolymer fibers having been dyed in yellow was dipped in the coating composition, taken out therefrom, and dried at 90° C. for 10 minutes. The resulting thermochromic acrylonitrile-vinyl acetate copolymer fibers (d=1.18) were cut to a length of 3 mm to form thermochromic piles for flock finish, which were then electrostatically flocked on a coated paper to obtain thermochromic flocked fabric.

The resulting flocked fabric had a green color at temperatures below 15° C., turned to yellow at temperatures above 15° C. and returned to green at temperatures below 15° C., indicating reversible thermochromism.

EXAMPLE 22

A thermochromic composition consisting of 1 part of 3',6'-dimethoxy-spiro[isobenzofuran-1(3H),9'[9H]xanthen]-3-one, 2 parts of naphthoic acid and 25 parts of myristyl alcohol was solidified to the inside thereof using an epoxy resin/amine curing agent system to obtain thermochromic fine particles having a particle size of 12 $\mu$m which satisfied the formula $r \leq 10\sqrt{D/d}$. Six hundreds parts of the thermochromic fine particles were uniformly mixed with 1000 parts of an acrylate ester-vinyl acetate copolymer resin emulsion having a solid content of about 50% to prepare a coating composition. The coating composition was applied onto 8D nylon fibers (d=1.14) with a spray gun and dried at 100° C. for 10 minutes, and the resulting thermochromic nylon fibers were cut to a 5 mm length to obtain thermochromic piles for flock finish. The piles were electrostatically flocked on nylon fabric on which foamed urethane had been fusion-bonded to produce thermochromic flocked fabric.

The flocked fabric had a yellow color at temperatures below 38° C., turned to colorless at temperatures above 38° C. and returned to yellow at temperatures below 38° C., indicating reversible thermochromism.

EXAMPLE 23

A thermochromic composition consisting of 1 part of 6'-(cyclohexylmethylamino)-3'-methyl-2'-(phenylamino)-spiro[isobenzofuran-1(3H),9'-[9H]xanthen]3-one, 2 parts of 1,1-bis(4-hydroxyphenyl)-cyclohexane, 12.5 parts of palmitic acid and 12.5 parts of decyl caprylate was encapsulized by interfacial polymerization in an acid chloride/phenol system to obtain thermochromic microcapsules having a particle size of 8 $\mu$m which satisfied the formula $r \leq 10\sqrt{D/d}$. Two hundreds parts of the microcapsules were uniformly mixed with 800 parts of an acrylic ester emulsion having a solid content of about 45% to prepare a coating ccmposition, and 500 parts of cotton (d=1.54) having a fineness corresponding to 5D was dipped therein, subjected to centrifugation to remove the excessive composition and dried at 100° C. for 10 minutes. The resulting thermochromic raw stock was subjected to carding to obtain sliver, which was then spun. The spun yarn was woven on a loom into towel to produce thermochromic towel fabric.

This towel fabric had a black color at temperatures below −3° C., turned to colorless at temperature above −3° C. and returned to black upon temperature fall below −3° C., indicating reversible thermochromism.

EXAMPLE 24

A thermochromic composition consisting of 1 part of 3-(1-ethyl-2-methyl-1H-indol-3-yl)-3-(4-diethylaminophenyl)-1(3H)-isobenzofuranone, 3 parts of 5-chloro-1,2,3-benzotriazole and 25 parts of dilauryl ether was encapsulized by coacervation to obtain thermochromic microcapsules having a particle size of 7 μm which satisfied the formula $r \leq 10\sqrt{D/d}$. Sixty parts of the microcapsules, 200 parts of a glycidyl ether epoxy resin and 80 parts of an amine curing agent were uniformly mixed to prepare a coating composition. The composition was sprayed onto pile fabric with russell stitches having a pile length of 15 mm out of 5D polyester fibers (d=1.38), followed by drying at 80° C. for 30 minutes. The loops were cut to obtain thermochromic polyester pile fabric.

The resulting thermochromic pile fabric had a blue color at temperatures below 30° C., turned to colorless at temperatures above 30° C. and returned to blue upon temperature fall below 30° C., indicating reversible thermochromism.

EXAMPLE 25

A thermochromic composition consisting of 1 part of 3'-(diethylamino)-6',8'-dimethyl-spiro[iso- benzofuran-1(3H),9'-[9H]xanthen]-3-one, 3 parts of 4-phenylphenol and 25 parts of 1,10-decanediol was solidified to the inside thereof using an acrylic resin/amine curing agent system to obtain thermochromic fine particles having a particle size of 4 μm which satisfied the formula $r \leq 10\sqrt{D/d}$. Four hundreds parts of the thermochromic fine particles and 600 parts of a vinyl acetate-ethylene-vinyl chloride terpolymer emulsion having a solid content of about 50% were unfirmly mixed to prepare a coating composition. Five hundreds parts of 3D crimped polypropylene fibers (d=0.91) were dipped in the coating composition, taken out therefrom and dried at 100° C. for 5 minutes to obtain thermochromic polypropylene fibers. The fibers were cut to a length of 50 mm to form raw stock, subjected to carding to form sliver and knitted on a high-pile knitting machine, followed by shearing to obtain thermochromic polypropylene high-pile fabric having a pile length of 20 mm.

The resulting high-pile fabric had an orange color at temperatures below 70° C., turned to colorless at temperatures above 70° C. and returned to orange upon temperature fall below 70° C., indicating reversible thermochromism.

EXAMPLE 26

One part of 6'-(diethylamino)-2'-[cyclohexyl(phenylmethyl)amino]-spiro[isobenzofuran-1(3H), 9'-[9H]xanthen]-3-one, 3 parts of 4,4-thiobis(3-methyl-6-t-butylphenol) and 30 parts of 12-hydroxystearic acid triglyceride were uniformly kneaded with 750 parts of polypropylene, and the mixture was cooled and finely pulverized to obtain thermochromic fine particles having a particle size of 8 μm which satisfied the formula $r \leq 10\sqrt{D/d}$. Six hundreds parts of the fine particles and 400 parts of an acrylate ester-vinyl acetate copolymer emulsion having a solid content of about 45% were uniformly mixed to prepare a coating composition. Four hundreds parts of raw stock composed of 7D acrylonitrilevinyl chloride copolymer fibers (d=1.25) having a flat cross-section and a cut length of 70 mm were dipped in the coating composition and, after removal of the excessive composition with an air gun, dried at 100° C. to obtain thermochromic raw stock. The raw stock was subjected to carding into sliver, knitted on a high-pile knitting machine and subjected to shearing to obtain thermochromic acrylonitrile-vinyl chloride copolymer high-pile fabric having a pile length of 35 mm.

The resulting high-pile fabric had a green color at temperatures below 50° C., turned to colorless at temperatures above 50° C. and again returned to green upon temperature fall below 50° C., indicating reversible thermochromism.

EXAMPLE 27

Each of thermochromic compositions which constitute three primary colors, i.e., a composition consisting of 1 part of 3-(1-ethyl-2-methyl-1H-indol-3-yl)-3-(4-diethylaminophenol)-1(3H)-isobenzofuranone, 2 parts of bis-(4-hydroxyphenyl)sulfone and 25 parts of butyl stearate reversibly changing in color between cyan and white, a composition consisting of 1 part of 9-(diethylamino)-spiro[12H-benzo[α]xanthene-12,1'(3'H)isobenzofuran-3'-one, 2 parts of bis-(4-hydroxyphenyl)sulfone and 25 parts of butyl stearate reversibly changing in color between magenta and white, and a composition consisting of 1 part of 3',6'-dimethoxyspiro[isobenzofuran-1(3H),9'-[9H]xanthen]-3-one, 2 parts of bis-(4-hydroxyphenyl)sulfone and 25 parts of butyl stearate reversibly changing in color between yellow and white, was encapsulized by coacervation using a gelatin/gum arabic system to obtain the respective thermochromic microcapsules having a particle size of 8 μm which satisfied the formula $r \leq 10\sqrt{D/d}$. Three hundreds parts each of the three kinds of microcapsules were uniformly mixed with 700 parts of an acrylic ester emulsion having a solid content of about 48% to prepare a coating composition. Four hundreds parts of a raw stock composed of 5D polyacrylonitrile fibers (d=1.17) were dipped in the coating composition and, after removal of the excessive composition by centrifugation, dried at 90° C. for 10 minutes. The resulting thermochromic raw stock was subjected to carding to form sliver. The three kinds of sliver were knitted on a computor high-pile knitting machine according to patterns obtained by three color separation using a computor, followed by shearing to obtain thermochromic polyacrylonitrile high-pile fabric having a pile length of 22 mm.

The resulting high-pile fabric had a pattern of a natural color at temperatures below 10° C. and turned to white at temperature above 10° C. The pattern of a natural color again appeared upon temperature fall below 10° C., indicating reversible thermochromism.

EXAMPLE 28

Bundles each consisting of 23 thermochromic polyurethane fibers obtained in Example 1 and 7 uncoated 7D polyurethane crimped fibers (corresponding to about 0.3 part per part of the thermochromic polyurethane fibers) were twisted with a number of twist of 40/m. The resulting thermochromic filament yarn was woven on a loom with the plain to obtain thermochromic polyurethane plain weave fabric.

EXAMPLE 29

Three hundreds parts of thermochromic nylon raw stock obtained by cutting the thermochromic nylon fibers as prepared in Example 2 to a length of 100 mm and 1200 parts of 7D polyester raw stock were blended by the use of a card and shaped into web. Four sheets of the web were parallel-laminated, soaked in an SBR resin emulsion, squeezed, and dried to obtain thermochromic non-woven fabric.

EXAMPLE 30

In the same coating composition as used in Example 4 was dipped 800 parts of 3D acrylonitrilevinyl acetate copolymer fibers (d=1.18), taken out therefrom and dried at 100° C. for 5 minutes. The resulting thermochromic fibers were cut to a length of 3 mm to obtain piles for flock finish. Eight hundreds parts of the thermochromic piles were uniformly mixed with 1000 parts of uncoated 3D rayon piles for flock finish having a pile length of 3 mm, and the mixed piles were electrostatically flocked on a nylon fabric base on which foamed urethane had been fusion-bonded to obtain thermochromic flocked fabric having a pile length of 2.7 mm.

EXAMPLE 31

One part of 3′,6′-dimethoxy-spiro[isobenzofuran-1(3H),9′-[9H]xanthen]-3-one, 2 parts of naphthoic acid, 12.5 parts of palmitic acid and 12.5 parts of decyl caprylate were uniformly kneaded with 800 parts of polyethylene, and the mixture was cooled followed by finely pulverizing to obtain thermochromic fine particles having a particle size of 12 $\mu$m which satisfied the formula $r \leq 10\sqrt{D/d}$. Two hundreds parts of the resulting fine particles and 750 parts of an acrylic ester resin emulsion having a solid content of about 42% were uniformly mixed to prepare a coating composition, and 750 parts of 10D acrylonitrile-vinyl chloride copolymer raw stock (d=1.25) having a cut length of 51 mm was dipped in the composition and, after removal of the excessive composition using squeeze rolls, dried at 90° C. for 15 minutes. Then, 750 parts of the resulting thermochromic raw stock, 150 parts of uncoated 3D acrylonitrile-vinyl chloride copolymer raw stock having a cut length of 38 mm and 150 parts of uncoated 5D polyester raw stock having a cut length of 38 mm were uniformly mixed using a card to form sliver, which was then knitted on a high-pile knitting machine, followed by shearing to obtain thermochromic high-pile fabric having a pile length of 20 mm.

The resulting high-pile fabric had a yellow color at temperatures below $-3°$ C., turned to colorless at temperatures above $-3°$ C. and again returned to yellow upon temperature fall below $-3°$ C., indicating reversible thermochromism.

Each of the fabrics obtained in Examples 28 to 31 exhibited satisfactory thermochromism and had sufficient gloss and feel to the toutch.

In order to evaluate performances of the textile materials according to the present invention, comparative samples were prepared as shown in the following comparative examples and subjected to comparative tests as shown in the following comparative test examples.

COMPARATIVE EXAMPLE 1

The same thermochromic composition as used in Example 1 was encapsulized by coacervation in a gelatin/gum arabic system to obtain thermochromic microcapsules having a particle size of 30 $\mu$m which was greater than $10\sqrt{D/d}$. A coating composition was prepared by uniformly mixing 150 g of the thermochromic microcapsules, 450 g of an aqueous urethane resin emulsion having a solid content of about 41% and 24 g of an aqueous epoxy resin, and 500 g of 7D polyurethane fibers (d=1.21) was dipped therein, taken up and dried at 110° C. for 2 minutes to obtain 580 g of thermochromic polyurethane fibers.

COMPARATIVE EXAMPLE 2

Thermochromic plain weave fabric was obtained in the same manner as in Example 13 except for changing the particle size of thermochromic microcapsules to 30 $\mu$m which was greater than $10\sqrt{D/d}$.

COMPARATIVE EXAMPLE 3

Thermochromic non-woven fabric was obtained in the same manner as in Example 18 except for changing the particle size of thermochromic microcapsules to 35 um which was greater than $10\sqrt{D/d}$.

COMPARATIVE EXAMPLE 4

Thermochromic knitted fabric with tubular stitches was obtained in the same manner as in Example 19 except for changing the particle size of thermochromic microcapsules to 30 $\mu$m which was greater than $10\sqrt{D/d}$.

COMPARATIVE EXAMPLE 5

Thermochromic flocked fabric was obtained in the same manner as in Example 22 except for changing the particle size of thermochromic fine particles to 29 $\mu$m which was greater than $10\sqrt{D/d}$.

COMPARATIVE EXAMPLE 6

Thermochromic towel fabric was obtained in the same manner as in Example 23 except for changing the particle size of thermochromic microcapsules to 25 $\mu$m which was greater than $10\sqrt{D/d}$.

COMPARATIVE EXAMPLE 7

Thermochromic pile fabric was obtained in the same manner as in Example 24 except for changing the particle size of thermochromic microcapsules to 22 $\mu$m which was greater than $10\sqrt{D/d}$.

COMPARATIVE EXAMPLE 8

Thermochromic high-pile fabric was obtained in the same manner as in Example 25 except for changing the particle size of thermochromic fine particles to 20 um which was greater than $10\sqrt{D/d}$.

COMPARATIVE TEST EXAMPLE 1

The thermochromic fibers obtained in Example 1 and those obtained in Comparative Example 1 were each bundled, and the appearance of the bundles was compared. The bundle of the fibers of Example 1 had a uniform blue color, and unevenness in color change with temperature was not observed. On the other hand, the bundle of the fibers of Comparative Example 1 showed non-uniformity in its blue color and suffered significant unevenness in color change with temperature that made the fibers useless in practice.

COMPARATIVE TEST EXAMPLE 2

Bundles each consisting of 10 thermochromic fibers obtained in Example 1 or Comparative Example 1 were twisted with a number of twist of 30/m, and the resulting thermochromic filaments were woven on a loom to obtain thermochromic woven fabric. When the fabric was subjected to testing for color fastness to washing according to JIS L 0844A-2, the fabric prepared from fibers of Example 1 had the equal concentration of the pigment to that before washing, whereas the pigment seriously fell off the fabric prepared from fibers of Comparative Example 1 to lose the substantial thermochromic function after washing once.

COMPARATIVE TEST EXAMPLE 3

The thermochromic fibers obtained in Example 1 or Comparative Example 1 were subjected to crimping, cut into lengths of 90 mm, subjected to carding to form sliver and woven into thermochromic pile fabric having a pile length of 45 mm. When subjected to brushing and polishing in the stage of textile finishing, the pile fabric out of the fibers of Example 1 was finished rich in softness and excellent in texture while retaining the pi.o.ment in a concentration equal to that before the textile finishing. To the contrary, the pile fabric out of the fibers of Comparative Example 1 underwent fall-off of the pigment due to the strong rubbing and almot lost the thermochromic effect.

The results of Comparative Test Examples 1 to 3 reveal that the relationship between a particle size of a thermochromic pigment (r) and a denier (D) of a fiber having a density (d) which satisfies the formula $r \leq 10\sqrt{D}/d$ is effective to impart superior thermochromic performances, such as freedom from uneven color change, washing resistance and rubbing resistance, to the textile materials.

COMPARATIVE TEST EXAMPLE 4

Appearance and texture were compared between the thermochromic plain weave fabric of Example 13 and that of Comparative Example 2; between the thermochromic non-woven fabric of Example 18 and that of Comparative Example 3; between the thermochromic tubular stitch knitted fabric of Example 19 and that of Comparative Example 4; between the thermochromic flocked fabric of Example 22 and that of Comparative Example 5; between the thermochromic towel fabric of Example 23 and that of Comparative Example 6; between the thermochromic pile fabric of Example 24 and that of Comparative Example 7; and between the thermochromic high-pile fabric of Example 25 and that of Comparative Example 8. As a result, every sample according to the present invention was uniformly colored and free from unevenness upon color change and felt soft to the toutch. While, any of the comparative samples was non-uniform in color, involved serious unevenness in color change which permitted of no practical use, and had very hard texture which permitted of no practical use. Further, when these samples were subjected to the washing test in accordance with JIS L 0844A-2, each of the samples of the present invention maintained the pigment at a concentration equal to that before the washing test, whereas each of the comparative samples greatly suffered falling-off of the pigment and almost lost the thermochromic properties after washing once.

COMPARATIVE TEST EXAMPLE 5

Each of the thermochromic pile fabrics of Example 24 and Comparative Example 7 and the thermochromic high-pile fabrics of Example 25 and Comparative Example 8 was subjected to brushing and polishing in the stage of textile finishing. As a result, the samples of the present invention were finished with good texture while retaining the pigment at a concentration equal to that before the finishing, whereas any of the comparative samples greatly suffered falling-off of the pigment due to the strong rubbing during textile finishing to lose substantial thermochromic properties.

As described above, the present invention succeeded to clear away all the limitations involved in the conventional thermochromic fibers that are obtained by coating fibers with aliquid crystal ink, and provides thermochromic textile materials excellent in thermochromism, softness, texture, rubbing resistance, washing resistance and finishing properties.

USE EXAMPLE 1

A thermochromic composition consisting of 1 part of 3,3-bis(1-ethyl-2-methyl-1H-insol-3-yl)-1(3H)isobenzofuranone, 2 parts of bisphenol A and 25 parts of cetyl alcohol was solidified to the inside thereof using an epoxy resin/amine curing agent system to obtain thermochromic fine particles having a particle size of 4 µm which satisfied the formula $r \leq 10\sqrt{D}/d$. One hundred parts of the thermochromic fine particles were uniformly mixed with 700 parts of an acrylate estervinyl acetate copolymer emulsion having a solid content of about 45% to prepare a coating composition, and 800 parts of 5D vinyl chloride-vinyl acetate copolymer fibers (d=1.34) having been subjected to crimping was dipped in the coating composition, taken out therefrom and dried at 100° C. for 10 minutes. The resulting thermochromic fibers were cut in a length of 45 mm and shaped into web by a card. Four sheets of the web were parallel-laminated. The laminate was immersed in an SBR resin emulsion, squeezed between squeeze rolls and dried to obtain thermochromic vinyl chloride-vinyl acetate copolymer non-woven fabric. A stuffed toy tomato was obtained from the fabric. This toy tomato had a red color at temperatures below 40° C., turned to yellow at temperatures above 40° C. and again returned to red at temperatures below 40° C., exhibiting reversible thermochromism.

USE EXAMPLE 2

One part of Crystal Violet Lactone, 2 parts of dodecyl gallate, 15 parts of myristyl alcohol and 10 parts of decyl caprylate were uniformly kneaded with 800 parts of polyethylene, and the mixture was cooled and finely pulverized to obtain thermochromic fine particles having a particle size of 10 µm which satisfied the formula $r \leq 10\sqrt{D}/d$. Five hundreds parrs of the thermochromic fine particles were uniformly mixed with 500 parts of a polyester resin emulsion having a solid content of about 25% to prepare a coating composition, and 800 parts of 7D polyester fibers (d=1.38) with a triangle cross-section was dipped in the coating composition, taken up therefrom and dried at 100° C. for 5 minutes. The resulting thermochromic fibers were subjected to crimping, made into bundles each consisting of 35 fibers and twisted with a number of twist of 30/m to obtain thermochromic filament yarn. The filament yarn was knitted with double denbigh stitches on a knitting machine, and the resulting knitted fabric was cut and sewed into a thermochromic stuffed toy ox.

USE EXAMPLE 3

Seven hundreds parts of 6D acrylonitrilevinyl acetate copolymer fibers (d=1.18) having been dyed in yellow were dipped in the same coating composition as used in Example 21, taken up therefrom and dried at 90° C. for 10 minutes. The resulting thermochromic acrylonitrile-vinyl acetate copolymer fibers were cut to a length of 4 mm to obtain thermochromic piles for flock finish. The piles were electrostatically flock-coated on coated paper, and the resulting thermochromic flocked fabric having a pile length of 3.8 mm was cut and sewed into a thermochromic stuffed toy crocodile.

The thus obtained toy crocodile had a green color at temperatures below 15° C., turned to yellow at temperatures above 15° C. and again returned to green upon temperature fall below 15° C., exhibiting reversible thermochromism.

USE EXAMPLE 4

The same thermochromic spun yarn obtained in Example 23 was woven on a loom to obtain towel fabric having a pile length of 2.5 mm. A thermochromic stuffed tcy giant panda was produced using the resulting thermochromic towel fabric and commpercially available white towel fabric having a pile length of 2.5 mm.

The toy had a black color on the parts made of the thermochromic towel fabric and looked like a giant panda at temperatures below −3° C. The black parts turned to white at temperatures above −3° C., making the whole body white, but returned to black upon temperature fall to −3° C. or lower, exhibiting reversible thermochromism.

USE EXAMPLE 5

The same coating composition as used in Example 24 was applied to pile fabric with russel stitches having a pile length of 10 mm which had been obtained from 5D polyester fibers (d=1.38) by the use of a spray gun, followed by drying at 80° C. for 30 minutes. The loops were cut open, and the resulting thermochromic polyester file fabric was cut and sewed into a thermochromic stuffed toy penguin.

The toy penguin made of the thermochromic pile fabric had a blue color at temperatures below 30° C., turned into colorless at temperatures above 30° C. and returned to blue upon temperature fall below 30° C., exhibiting reversible thermochromism.

USE EXAMPLE 6

Seven hundreds parts of 10D polyester raw stock (d=1.38) were dipped in the same coating composition as used in Example 6, centrifuged to remove the excessive composition and dried at 90° C. for 15 minutes. The resulting thermochromic polyester raw stock was subjected to carding to form web. Three sheets of the web were cross-laminated, and the laminate was spray-coated with an NBR resin emulsion from a spray nozzle and dried. A thermochromic stuffed toy zebra was made using the resulting thermochromic polyester non-woven fabric and commercially available white non-woven fabric.

The parts made of the thermochromic non-woven fabric had blue color at temperatures below 10° C. making the toy look like a zebra, turned to white at temperatures above 10° C. making the whole body white, and again returned to blue, exhibiting reversible thermochromism.

USE EXAMPLE 7

The same thermochromic vinyl chloridevinylidene chloride copolymer raw stock as prepared in Example 19 was subjected to carding to form sliver, which was then spun into thermochromic spun yarn. The resulting spun yarn was embroidered on the back of a toy tortoise made of commercially available fabric in the pattern of tortoise shell.

The tortoise shell made of the thermochromic spun yarn had a blue color at temperatures below −10° C. The shell pattern disappeared at temperatures above −10° C. but made its appearance upon temperature fall below −10° C., showing reversible thermochromism.

USE EXAMPLE 8

A thermochromic composition consisting of 1 part of 3'-(diethylamino)-6',8'-dimethyl-spiro[isobenzofuran-1(3H),9'-[9H]xanthen]-3-one, 3 parts of 4-phenylphenol and 25 parts of butyl stearate was solidified to the inside thereof to obtain thermochromic fine particles having a particle size of 6 μm which satisfied the formula r≦10√D/d. Six hundreds parts of the thermochromic fine particles were uniformly mixed with 400 parts of a vinyl acetate copolymer resin emulsion having a solid content of about 50% to prepare a coating composition. Four hundreds parts of 10D acrylonitrile-vinyl chloride copolymer raw stcck with a flat cross-section having a cut length of 51 mm were dipped in the coating compositicn and, after removal of the excessive composition by means of an air gun, dried at 100° C. for 10 minutes. Fcur hundreds parts of the resulting thermochromic raw stock, 200 parts of 7D polyacrylonitrile raw stock having a cut length of 51 mm which had been dyed in blue and 200 parts of uncoated 3D polyacrylonitrile raw stock having a cut length of 38 mm were uniformly mixed and shaped into sliver by the use of a card. The sliver was knitted on a high-pile knitting machine, and the knitted fabric was subjected to shearing to obtain thermochromic high-pile fabric having a pile length of 25 mm. The high-pile fabric was cut and sewed into a thermochromic stuffed toy koala.

The toy koala had very good texture, and it had a brown color at temperatures below 10° C., turned to blue at temperaturea above 10° C. and returned to brown upon temperature fall below 10° C., exhibiting reversible thermochromism.

USE EXAMPLE 9

The same coating composition as used in Example 1 was sprayed on 800 parts of 8D nylon fibers (d=1.14) with a spray gun and dried at 100° C. for 10 minutes. The resulting thermochromic nylon fibers were cut into a length of 5 mm to obtain piles for flock finish. The files were electrostatically flock-coated on nylon fabric on which foamed urethane had been fusion-bonded, and the resulting flocked fabric was cut and sewed on a doll's head to make a doll with thermochromic hair.

USE EXAMPLE 10

A thermochromic composition consisting of 1 part of 3,3-bis(1-ethyl-2-methyl-1H-indol-3-yl)-1(3H)isobenzofuranone, 2 parts of naphthoic acid and 25 parts of cetyl alcohol was encapsulized by interfacial polymerization using an acryl resin/amine curing agent system to obtain thermochromic microcapsules having a particle diameter of 7 μm which satisfied the formula $r \leq 10\sqrt{D/d}$. Five hundreds parts of the microcapsules were uniformly mixed with 500 parts of an acrylic ester resin emulsion having a solid content of about 45% to prepare a coating composition, and 800 parts of 7D polyacrylonitrile fibers (d=1.17) were dipped in the composition, taken out therefrom and dried at 100° C. for 5 minutes. The resulting thermochromic fibers were subjected to crimpt and cut on the bias into lengths of 80 to 130 mm to obtain thermochromic raw stock. The raw stock was subjected to carding and then twisting in a usual manner to obtain bulky yarns. Three of the bulky yarns were bundled and twisted to obtain wooly yarns having an outer diameter of about 3 mm. The wooly yarns were cut to appropriate lengths, and the ends thereof were adhered to a doll's head to make a doll with thermochromic hair.

USE EXAMPLE 11

Eight hundreds grams of wool fibers (d=1.32; fineness: corresponding to 4–20D; fiber length: 40–130 mm) were dipped in the same coating composition as used in Example 10, taken up therefrom and dried at 100° C. for 5 minutes. The resulting thermochromic raw stock was subjected to twisting in a usual manner to form wool yarns having an outer diameter of about 3 mm. A doll with thermochromic hair was produced using the resulting wool yarns in the same manner as in Example 10.

The doll's hair obtained in Use Examples 2 and 3 had a pink color at temperatures below 40° C. but turned to colorless at temperatures above 40° C., exhibiting reversible thermochromism.

While the invention has been described in detail and with reference to specific embodiments thereof, it will be apparent to one skilled in the art that various changes and modifications can be made therein without departing from the spirit and scope thereof.

What is claimed is:

1. A thermochromic textile materaial comprising a textile material composed of a plurality of fibers coated with a thermochromic layer containing a binder and a thermochromic pigment comprising an electron-donative, color former, an electron-accepting developer and a color-changeable controlling agent, wherein each of the fibers is coated with the thermochromic layer containing the thermochromic pigment having a particle size satisfying the formula:

$$0.01 \leq r \leq 10\sqrt{D/d}$$

wherein r represents the particle size of the pigment in μm; D represents the fineness of the fiber in denier; and d represents the density of the fibers in g/cm$^3$, in which said thermochromic layer is coated to a coverage of from 3 to 90% by weight based on the fibers on a dry basis, and said composition is present in an amount of from 5 to 80% by weight based on the thermochromic layer on a dry basis.

2. A textile material as claimed in claim 1, wherein said pigment is present in an amount of from 10 to 60% by weight based on the thermochromic layer on a dry basis.

3. A textile material as claimed in claim 1, wherein said thermochromic layer is coated to a coverage of from 5 to 70% by weight based on the fiber on a dry basis.

4. A textile material as claimed in claim 1, wherein said material is in the form of fiber, raw stock, yarn or fabric.

5. A textile material as claimed in claim 4, wherein said fabric is woven fabric, non-woven fabric, knitted fabric or pile fabric.

6. A textile material as claimed in claim 1, wherein said material comprises blended fibers composed of said fibers each of which is coated with the thermochromic layer and uncoated fibers at a weight ratio of 1:0.01 to 20.

7. A textile material as claimed in claim 6, wherein said weight ratio is 1:0.1 to 10.

8. A textile material as claimed in claim 1, wherein said thermochromic layer further contains a colored component.

9. A thermochromic textile material containing the thermochromic pigment satisfying the formula of claim 1, whereby uniform distribution of thermochromic pigments is achieved.

10. A thermochromic textile material containing a pigment as claimed in claim 9, whereby uniform thermochromic color change is achieved.

* * * * *